(12) United States Patent
Schackmuth et al.

(10) Patent No.: US 7,973,642 B2
(45) Date of Patent: Jul. 5, 2011

(54) RFID FOOD PRODUCTION, INVENTORY AND DELIVERY MANAGEMENT METHOD FOR A RESTAURANT

(75) Inventors: Glenn Schackmuth, Oswego, IL (US); Gerald A. Sus, Frankfort, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 953 days.

(21) Appl. No.: 11/414,420

(22) Filed: Apr. 28, 2006

(65) Prior Publication Data

US 2007/0254080 A1  Nov. 1, 2007

(51) Int. Cl.
G06F 7/00 (2006.01)
(52) U.S. Cl. ............ 340/5.92; 340/540; 340/10.51
(58) Field of Classification Search ............ 340/5.92
See application file for complete search history.

(56) References Cited

U.S. PATENT DOCUMENTS

| | | | |
|---|---|---|---|
| 4,922,435 A | 5/1990 | Cahlander et al. | |
| 5,360,965 A * | 11/1994 | Ishii et al. | 219/705 |
| 6,011,243 A | 1/2000 | Arnold et al. | |
| 6,026,372 A * | 2/2000 | Savage | 705/15 |
| 6,119,587 A | 9/2000 | Ewald et al. | |
| 6,209,447 B1 | 4/2001 | Ewald et al. | |
| 6,298,331 B1 * | 10/2001 | Walker et al. | 705/15 |
| 6,320,169 B1 | 11/2001 | Clothier | |
| 6,358,548 B1 | 3/2002 | Ewald et al. | |
| 6,508,762 B2 | 1/2003 | Karnieli | |
| 6,607,766 B2 | 8/2003 | Ewald et al. | |
| 6,658,994 B1 * | 12/2003 | McMillan | 99/468 |
| 6,930,296 B2 | 8/2005 | Chen | |
| 6,953,919 B2 | 10/2005 | Clothier | |
| 6,957,777 B1 | 10/2005 | Huang | |
| 6,982,640 B2 * | 1/2006 | Lindsay et al. | 340/540 |
| 7,009,519 B2 * | 3/2006 | Leonard et al. | 340/572.8 |
| 7,132,926 B2 | 11/2006 | Vaseloff et al. | |
| 7,245,221 B2 * | 7/2007 | Claudatos et al. | 340/572.1 |
| 7,304,275 B2 * | 12/2007 | Chun et al. | 219/506 |
| 7,375,294 B2 * | 5/2008 | Kraft | 177/25.15 |
| 2002/0148858 A1 * | 10/2002 | Bertone | 222/129.4 |
| 2003/0095034 A1 | 5/2003 | Clothier | |
| 2004/0056761 A1 | 3/2004 | Vaseloff et al. | |
| 2004/0099735 A1 | 5/2004 | Neumark | |
| 2004/0208961 A1 * | 10/2004 | Reckert et al. | 426/275 |
| 2004/0220697 A1 * | 11/2004 | Chavez et al. | 700/236 |
| 2005/0193901 A1 | 9/2005 | Buehler | |
| 2005/0211775 A1 * | 9/2005 | Vaseloff et al. | 235/385 |
| 2005/0256774 A1 * | 11/2005 | Clothier et al. | 705/15 |
| 2005/0258961 A1 | 11/2005 | Kimball et al. | |
| 2006/0033620 A1 * | 2/2006 | Mathewson et al. | 340/572.1 |
| 2006/0038008 A1 * | 2/2006 | Miller et al. | 235/383 |
| 2006/0043179 A1 | 3/2006 | Nycz et al. | |
| 2006/0218057 A1 * | 9/2006 | Fitzpatrick et al. | 705/28 |

* cited by examiner

*Primary Examiner* — George A Bugg
*Assistant Examiner* — Naomi Small
(74) *Attorney, Agent, or Firm* — Ryndak & Suri LLP

(57) ABSTRACT

A system and method for managing food production, inventory and delivery in a restaurant by automatically monitoring the types and quantities of food types that have been cooked and are in a cooked food holding area. Food holding trays are equipped with radio frequency identification (RFID) tags, and holding cabinets are equipped with RFID interrogators. The type and quantity of food items are determined manually or by machine vision or weighing systems, and the data is stored on the RFID tags and in a controller. The system manages the use of food items on a first-in, first-out basis, alerts operators when the inventory of an item is nearing exhaustion, and alerts operators when food items in the holding area must be discarded. The system manages movable trays of food no matter where in the facility they are located.

18 Claims, 4 Drawing Sheets

RFID FOOD PRODUCTION, INVENTORY AND DELIVERY MANAGEMENT METHOD FOR A RESTAURANT

FIELD OF THE INVENTION

The present invention relates generally to a system and method for managing food production, inventory and delivery in a restaurant, and in particular to a system and method using radio frequency identification (RFID) technology for managing production, inventory and delivery of a variety of food items in a quick service restaurant.

BACKGROUND OF THE INVENTION

In restaurants and other food service establishments there is a need to process food uniformly, to maintain cooked food items at an appropriate and safe temperature and to serve fresh food items quickly to customers. This is particularly the case in quick service restaurants, where customers expect to receive their food with a minimum delay. Of course, customers also expect the food to be of consistent high quality and served at the appropriate temperature. The rate of customer demand typically varies at different times of day, with some periods such as lunch having extremely high rates of demand. In order to meet peak demand and provide quick service, certain food items must be precooked and stored under conditions suitable to preserve freshness and safety and maintain the food items at the appropriate temperature for service.

Typical foods of interest in quick service restaurants include sandwiches composed of a bun, roll or other bakery-cooked bread product and a sandwich filling that is cooked on site at the quick service restaurant. Typical sandwich fillings include hamburger patties, grilled or breaded and fried chicken patties or filets, breaded fish filets, sausage patties, bacon, Canadian bacon and eggs. The restaurant may also offer products other than sandwiches, such as French fries, chicken strips and nuggets, and individual pies.

To provide both quick service and food with a fresh taste and appearance, it is often desirable to cook a quantity of individual food items such as sandwich fillings, store them in a holding area, and incorporate them on a first-in, first-out basis into individual sandwiches as orders are placed. To ensure consistent quality, the cooking and preparation processes must be performed uniformly and, if food items in the holding area are not sold prior to the expiration of a preset period of time, they are discarded. Because of the high volume of sales in a typical quick service restaurant, even a small increase in the efficiency of the handling of cooked food items, and a small decrease in the number of food items which must be discarded, can result in considerable savings of time and expense.

A need exists for a system and method that can automatically monitor the types and quantities of food items that have been cooked and are in the holding area at any given time, can alert restaurant personnel when the inventory of a particular item is nearing exhaustion and that more of such items should be cooked, and can alert personnel when food items in the holding area must be discarded. It would be desirable for the system to manage food items in the holding area so that they are utilized on a first-in, first out basis, and to manage movable trays of cooked food no matter where they are located in the facility.

SUMMARY OF THE INVENTION

In accordance with the present invention, a system is provided for managing the handling of food items in a restaurant. The system includes at least one cooking station such as a grill or fryer, at least one cooked food item holding device, means for identifying the type and quantity of the food items, data storage means associated with the cooked food item holding device, and a controller for receiving data from the data storage means. The cooked food holding device may be any suitable tray, bin, basket, plate, or other movable container, open or closed, or a fixed or moveable holding area such as a defined area on a countertop or a cart.

In accordance with another aspect of the present invention, the cooked food holding device is a movable holding device such as a tray which has an RFID tag. A cooked food storage area is provided for receiving and holding the movable holding device. The cooked food storage area is equipped with an RFID sensor for detecting and reading the RFID tag.

In accordance with another aspect of the invention, a system is provided with at least one cooking station, a plurality of trays each having an RFID tag, a heated cabinet with a plurality of slots for receiving and holding the trays, each slot being equipped with an RFID interrogator for reading data from and writing data to the RFID tag on a tray inserted into the slot, apparatus to identify automatically the type and quantity of food items, and a controller for receiving and storing data from the identification apparatus and the RFID interrogator and for applying a time stamp to the RFID tag when a tray is placed in a slot.

In another aspect of the invention, the cooked food storage area is a heated cabinet with a plurality of slots for receiving and holding a plurality of trays. Each slot is equipped with a weight sensor such as a load cell for measuring the weight of the food on the tray and detecting changes in weight as food items are removed.

In another aspect of the invention, a machine vision system including a camera is used to identify automatically the type and quantity of food items at a cooking station or on a tray. In still another aspect of the invention, a weighing system including a load cell is used to identify automatically the type and quantity of food items at a cooking station or on a tray.

In another aspect of the invention, an RFID tag printer is connected to a point of sale terminal for printing RFID tags which are affixed to food containers.

In yet another aspect of the invention, a method for managing the handling of food items in a restaurant includes the steps of preparing a plurality of one type of food item, identifying the type and quantity of the prepared food items, providing at least one prepared food holding device, placing the prepared food items in the holding device, recording the time at which the food items were placed in the holding device, and tagging the holding device with an RFID tag to identify the type and quantity of food items and the time.

In still another aspect of the invention, the method includes providing a food storage area for receiving a plurality of food holding devices, and establishing an order for utilizing the food items from the holding device on a first-in, first-out basis. In accordance with another aspect of the invention, a signal is generated when the time elapsed since the recorded time exceeds a preset limit, indicating that the food items should be discarded.

In still another aspect of the invention, the method includes storing the number of food items ordered by and delivered to customers at a point of sale terminal, and the number of food items identified on an RFID tag but not sold, and calculating the percentage of food products sold versus the percentage to waste.

In another aspect of the invention, the type and number of food items are entered manually by an operator. In yet another aspect of the invention, the type and quantity of food items are automatically determined by a machine system such as a machine vision system including a camera or a weighing system including a load cell. In still another aspect of the invention, the type and quantity data are input by a combination of manual and automatic means.

DETAILED DESCRIPTION OF THE INVENTION

The system and method of the invention provide convenient, efficient and automated management of all aspects of cooked food handling in a quick service restaurant. As used herein, "handling" refers to the production, storage and delivery of cooked food items.

Figure 1:
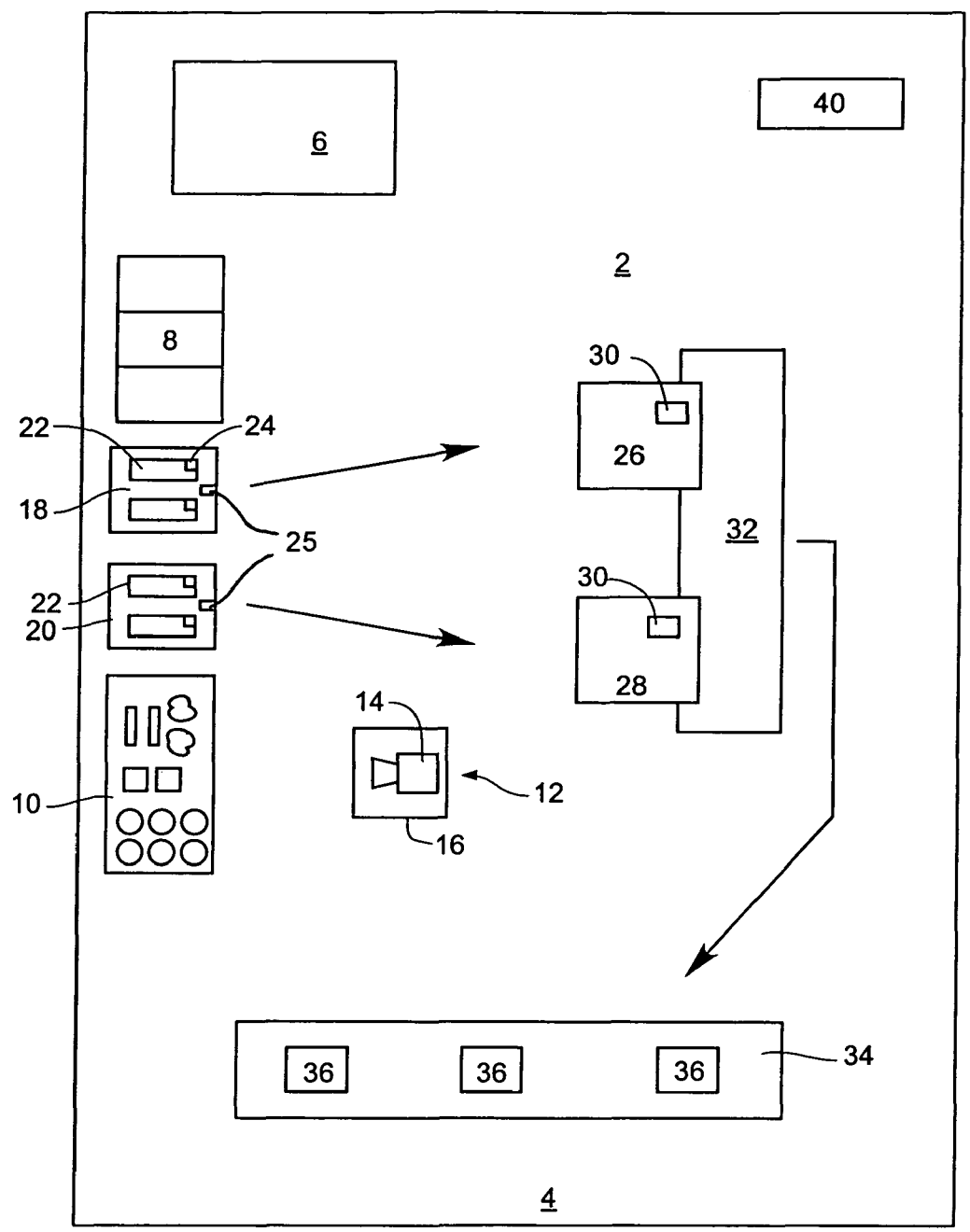
FIG. 1 is a schematic floor plan of a restaurant utilizing the system of the invention.

FIG. 1 illustrates one example of a floor plan of a restaurant equipped with the system of the invention. The restaurant includes kitchen area 2 and customer service area 4. Uncooked food items are stored in storage cabinet 6 which may be, for example, a refrigerator, freezer or pantry cabinet. Kitchen area 2 includes two cooking stations, a fryer 8 and grill 10. Fryer 8 is used for preparing food items such as French fries, breaded chicken patties and filets, breaded fish filets, fried pies and the like. A typical restaurant may have a 2- or 3-vat fryer. Food items are placed in baskets that are lowered into the vat of the fryer for cooking. Grill 10 is used for cooking food items such as hamburger patties, grilled chicken, sausage patties, bacon, Canadian bacon, and eggs. Grill 10 may be a traditional flat, open grill, or a double-sided "clamshell" type that cooks food items on both sides simultaneously. Of course, other types of cooking stations may be used with the system and method of the invention depending on the type of food being prepared, including, without limitation, ovens, pizza ovens, conveyor ovens, pasta cookers, and induction cooktops.

The identity and quantity of food items can be determined in a number of ways, including by a human operator, by a machine, or by a combination thereof. The machine may include a machine vision or camera device, optical detectors, and/or weighing apparatus, for example.

In the illustrated embodiment, a vision system 12 including a camera 14 is mounted adjacent grill 10 in a position where camera 14 can capture an image of the entire cooking surface of grill 10. Preferably, camera 14 is located in a camera enclosure 16 which protects it from smoke, grease and heat. Camera enclosure 16 is preferably mounted on the ceiling of kitchen area 2. See FIG. 3. Vision system 12 is utilized to determine the type and number of food products on a grill as hereafter described.

Food transfer stations 18, 20 are located adjacent to fryer 8 and grill 10, respectively. Trays 22 are placed on food transfer stations 18, 20. As food is cooked in fryer 8 and on grill 10, it is removed and placed on trays 22. Each tray 22 has an embedded or attached RFID tag 24. Each tray 22 is assigned a unique identifying number which is stored on the RFID tag 24. An RFID sensor 25 is located at each food transfer station. A manual data entry device such as a keypad (not shown) may also be located at each food transfer station. See FIG. 6 for an example of a tray 22.

Each RFID tag 24 is preferably a passive type RFID device. Passive RFID devices are small, inexpensive and do not require their own internal power source such as a battery. Such a device includes a transponder with an internal antenna and a CMOS integrated circuit including a small amount of non-volatile memory such as EEPROM. The memory can store both the unique identifying number and other data. The RFID tag is used in conjunction with an RFID sensor (sometimes called an interrogator), which includes an antenna, a transceiver and a decoder. The sensor emits a radio frequency (RF) signal. When the RFID tag is in close enough proximity to the sensor so that it passes through the RF field, the RFID tag is activated. The RF signal induces a small electrical current in the tag's antenna providing just enough power for the integrated circuit to operate. The tag transmits the data in its memory, which is read by the sensor, decoded and passed to the host computer. The sensor may also write data to the memory in the RFID tag.

RFID tag 24 may be a permanent type RFID device which is embedded in the material of tray 22 or permanently affixed thereto, or it may be clipped or otherwise temporarily attached to tray 22. In the alternative, RFID tag 24 may be a disposable RFID device which is replaced with each new batch of food items. An RFID tag printer (not shown) may be provided to produce disposable RFID tags.

Figure 5:
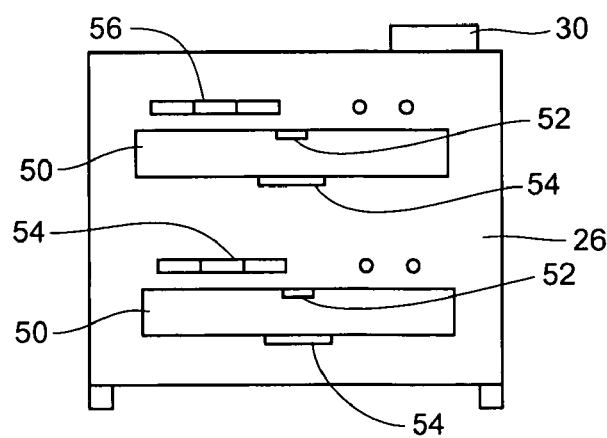
FIG. 5 is a front elevation view of a cooked food holding cabinet for use with the invention.

Food storage cabinets 26, 28 are provided for receiving and storing cooked food items from fryer 8 and grill 10, respectively. Preferably, food storage cabinet 26 is adapted for holding fried foods, and food storage cabinet 28 is adapted for holding grilled food. Trays 22 are removed from food transfer stations 18, 20 and are carried to and placed into the appropriate cabinet 26 or 28. Cabinets 26, 28 are open on opposite sides, and include multiple slots for receiving trays 22, which are inserted into the slots on the side of the cabinets 26, 28 facing the cooking stations. Each cabinet includes a storage cabinet controller 30. A suitable storage cabinet controller 30 is the Allen-Bradley Micrologix 11 controller available from Rockwell Automation of Milwaukee, Wis. This controller provides built-in Ethernet and serial communications, robust construction, compact size and low cost. It provides multiple digital inputs and outputs, as well as analog inputs suitable for use with load cells for weight measurements. FIG. 5 shows an example of a food storage cabinet 26, which is described in more detail below.

A food preparation table 32 is located adjacent cabinets 26 and 28. Personnel working at table 32 use tongs or other tools to remove food items from trays 22, preferably without removing trays 22 from cabinets 26, 28, by inserting the tools into the open side of the cabinet facing table 32 and removing the selected food item. The personnel then complete assembly of the sandwich or other item on food preparation table 32, and deliver it to service counter 34 for delivery to customers in customer service area 4. Point of sale (POS) terminals 36 (e.g., cash registers) are located on service counter 34.

System controller 40 is located at a convenient location in or near kitchen area 2. System controller 40 is connected by wire or wireless network connection, for example, an Ethernet network, to vision system 12, holding cabinet controllers 30 and POS terminals 36, as well as to other components in the system which will be described below. System controller 40 may run a general production and inventory management program which can interface with the system of the invention, and may also be connected to an off-site central computer system or network (not shown) for a group of restaurants via a network connection. System controller 40 may be a personal computer (PC), server or dedicated controller such as the Allen-Bradley Micrologix 11 discussed above.

Figure 2:
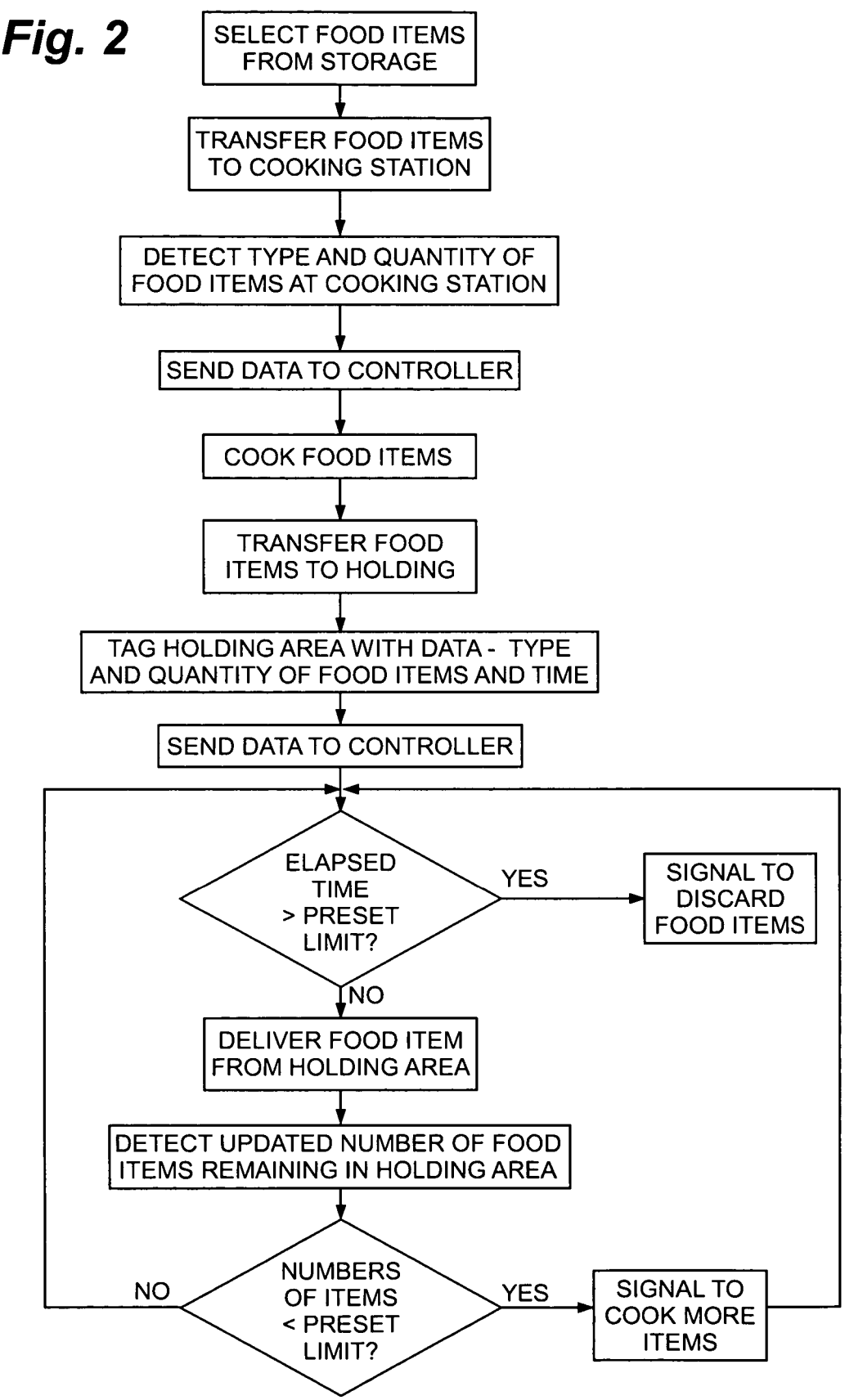
FIG. 2 is a flow chart of the basic steps in the method of the invention.

FIG. 2 is a flowchart showing the basic steps in the method of the invention using the system as installed in a restaurant as described above. First, an employee removes the desired food items from the storage cabinet 6 and then transfers them to a cooking station, either grill 10 or fryer 8 as appropriate for the type of food item. The selected food items are then cooked in the grill 10 or fryer 8, either manually or under automatic control as is known in the art. The system automatically detects the type and number of food items on the grill 10 or in a fryer basket, by means of a vision or weighing operation as explained in more detail below, and transmits the food type and number data to holding cabinet controllers 30 and/or system controller 40. When the food items are done, an employee transfers them to a food holding device. The food holding device may be any suitable fixed or movable space or volume for holding cooked food items, for example, a tray, bin, basket, plate, carton or other container, open or closed, or simply a defined area on a countertop or cart, but it is preferably a movable device such as tray 22. In some cases the food holding device may be the same device in which the food items were cooked, for example, a fry basket or a cooking vessel for use in a bain-marie (water bath). Each different type of food item is preferably placed on a separate food holding device such as a tray 22.

If only one type of food is being prepared, its type will obviously already be known and its identity can be pre-stored in the system. If there are multiple types of food, the type of food being prepared can be determined by machine, such as a machine vision system as described below, or alternately the type of food may be input by a human operator via a keypad, keyboard or other data entry means located near a cooking station, or via a mobile data entry device such as a personal digital assistant (PDA).

As illustrated, vision system 12 including camera 14 is used to count the number of items on grill 10, determine the type of items on the grill 10, and relay the information to system controller 40 and/or the holding area controllers 30. The vision system 12 essentially takes a "snap shot" of the grill surface and uses software to analyze the food items. In the case of a clamshell grill, the snap shot is taken when the food is cooked and the grill is opened, and the analysis of the image is performed while the operator is loading the food items into a tray. The software uses pictures that are stored in the vision system's memory as a reference for determining the type of food. To set up the reference images, a technician takes a picture of each item using the camera 14 and its associated software. Preferably, camera 14 is a color camera, as color facilitates the identification of similar-appearing food item types. In operation, camera 14 scans the entire surface of grill 10 and determines all the food item types thereon.

Once the food item type and count have been determined by the vision system 12, the information is transferred to the holding area controllers 30 and/or system controller 40 where a time stamp is applied. This information resides in a database in the controller's memory until it is written to a tray's RFID tag, as will be discussed below. The operator removes the cooked food items from grill 10 and loads them onto trays 22 at food transfer station 20 located adjacent grill 10.

In the case of a clamshell type grill, instead of using a vision system, a thickness measuring system may be used to identify the type of food items. Typically, each type of food item has a different nominal thickness. A sensor on the movable upper platen of the clamshell grill may be used to measure the nominal thickness of the food items on the grill based on the height of the platen above the lower grill surface when it contacts the food item. That measurement can be compared to stored thickness data in system controller 40 to identify the type of food. A weighing device can be used to determine the number of items on the grill or alternately, a human operator can enter the number of items via a keypad or other data entry device provided near the grill, or via a mobile data entry device such as a personal digital assistant (PDA).

The vision system described for use with the grill is less suitable for use with the fryer, where the food items are placed into a basket and immersed in oil for cooking and thus not as readily visible to a camera as individual food items on a grill. Thus, a weighing system is preferably used for foods prepared in the fryer. Food transfer station 18 located adjacent fryer 8 preferably includes a weight sensor such as a load cell. An empty tray is placed over the load cell, which weighs the tray and sends a weight signal to system controller 40. System controller 40 tares out the tray weight, i.e., resets the weight value to zero. The operator removes a fry basket of cooked food items from fryer 8, and after allowing excess oil to drain, dumps the food items onto the tray 22. The load cell detects the weight of the food items and sends that weight signal to system controller 40, which determines the number of food items present based on stored food item weight profile data. See FIG. 4 and further discussion below.

The weight information may be used to automatically control other operations. For example, when a basket of cooked French fries is dumped into a salting tray, the RFID tag is read and compared to previous information sent from the weighing system. The correct amount of salt is distributed on the fries. Additionally, the process time information can be communicated to system controller 40 and/or a remote central computer for production/waste monitoring.

Once the food item type and count have been determined by the weight system, the information is transferred to holding cabinet controllers 30 and/or system controller 40 where a time stamp is applied. This information resides in a database in the system controller's memory until it is written to a tray's RFID tag, as will be discussed below.

In addition, or in the alternative, each fry basket may be equipped with an RFID tag. This tag will store an identification number, the type of food (e.g., French fries) and the fill quantity of the basket. This data is transferred to a controller for the fryer which will initiate the appropriate cook cycle for the food product, controlling such variables as oil temperature and time of frying. The data can also be used to control an automatic salting device after the French fries are cooked.

An employee carries tray 22 from the food transfer station 18 or 20 to the holding area and places it into a slot in the appropriate holding cabinet 26 or 28 for the type of food item on the tray 22. When the tray 22 is placed in a slot, a sensor 52 (shown in FIG. 5) on each slot in the cabinet detects the RFID tag 24 on the tray 22 and reads the data thereon, specifically the tray identification number. This data is transmitted to the holding cabinet controller 30, which evaluates the tray number and associates it with the grill or fryer location. The food type and food count information from the associated grill or fryer, which was previously received from vision system 12 or system controller 40 and stored in the holding cabinet controller's database, is sent to the memory in the tray's RFID tag 24. If the memory transfer has an error, the data is sent directly from the system controller 40 to the holding cabinet controller 30 via the network. Thus, the holding cabinet controller 30 gets the information from the counting system and ensures that the correct information is on the tray's memory when the tray 22 is placed into the holding area.

In the alternative, instead of using a writable RFID tag and transferring food item type and count data to the tag for each batch of food items as described above, RFID tag 24 may have a fixed identification number and be permanently associated with a specific type and quantity of food items and, if desired, with specific time data (e.g., cooking time or holding time) for that type and quantity of food items. The food type and count data may be permanently stored in the memory on RFID tag 24, or controller 40 may associate the tag identification number with food type and count information stored in a database of controller 40.

When a tray 22 is inserted and the food type and quantity have been determined, cabinet controller 30 can automatically initiate heating at a temperature appropriate for that food type. In an alternate mode of operation, if the slot is already at a particular temperature, the controller can signal a warning to a user if he inserts a tray with food items requiring a different temperature set point.

Alternately, the slot in the holding area may have a load cell for weighing the tray to determine the number of food items in the tray. The load cell detects the weight of the food items and sends that weight signal to holding area controller 30, which determines the number of food items present based on stored food item weight profile data. For example, the food items may be 10:1 hamburger patties with a nominal weight of 1/10 pound each, 4:1 hamburger patties with a nominal weight of 1/4 pound each, etc. The database in controller 40 may be programmed to account for the typical difference between nominal pre-cooked and post-cooked weight of the food items.

The holding area controller 30 is pre-programmed with a time limit for holding each type of food in the storage area, and periodically checks to see if the preset time has been exceeded. If it has, controller 30 sends a signal by, e.g., turning on a red light or LED indicator above the slot where the expired food is located and/or activating an audible alarm. This indicates to the restaurant personnel that those food items should be removed and discarded.

Employees working at food preparation table 32 remove food items from the trays as needed to fill customer orders. A load cell located below each tray detects the change in weight caused by removal of a food item and updates the count of remaining food items in that tray. If the number of food items falls below a preset number, the computer sends a signal to alert a staff member to cook more of that type of food. The preset number may vary depending on the time of day to accommodate periods of varying demand.

If there are multiple trays 22 of the same type of food items in the holding cabinets 26, 28, cabinet controllers 30 can signal which tray 22 should be used first based on the time stamp applied to each RFID tag 24 and the time remaining until expiration of the usable life of the product. The signal may be via LEDs or lights above each slot in the cabinet (see FIG. 5 and discussion below) or another type of display.

Figure 3:
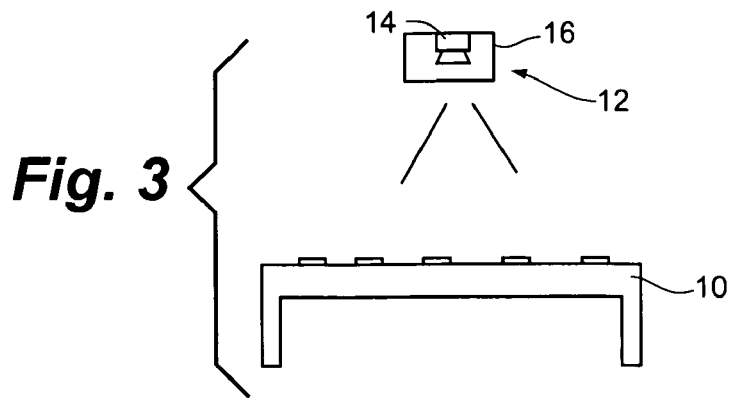
FIG. 3 is a schematic elevation view of a grill cooking station for use with the invention.

As shown in FIG. 3, vision system 12 is provided at grill 10. Vision system 12 includes camera 14, camera software and, if needed, supplemental lighting (not shown). Camera 14 is preferably mounted on the ceiling above grill 10 so that camera 14 is out of the way but still has a clear view of the entire grill surface. Camera 14 may be enclosed in an enclosure 16 with a transparent panel to protect it from smoke, heat and grease. A suitable vision system is available from Banner Engineering Corp. of Minneapolis, Minn., which is a self-contained camera system with a built-in processor, an Ethernet connection and an output for connecting a television monitor. The camera operates with Banner's PresencePLUS software. The inspection time for this camera system is approximately one second. A standard grayscale camera may be used in basic applications. However, in a restaurant that serves a variety of food items having similar sizes, shapes and appearances, a color camera is preferred since color makes it easier to distinguish the different types of food items.

Camera 14 may be positioned slightly off to one side of grill 10 to avoid smoke and grease. The field of view of camera 14 is preferably slightly larger than the grill size. Depending on the type of camera used and the ambient lighting in the kitchen area, supplemental lighting may be required to ensure consistent operation of the vision system. For example, standard fluorescent lighting may be adequate, but with some cameras the ballast used to drive the fluorescent tubes may need to be a high frequency ballast rather than a standard magnetic ballast.

The vision system software includes analysis tools that use information from an image captured by the camera to create size, shape and count measurements. These tools use so-called "blob" processing to identify various food items with different sizes and then separate those that are the same size. Blob analysis consists of a series of processing operations and analysis functions that produce information about any two-dimensional shape in an image captured by the camera. It is useful for finding "blobs" whose spatial characteristics satisfy certain criteria and find their size and number. As such, it is well suited to identifying and counting food items of known shapes and sizes. A "blob tree" is defined in the software that includes all of the blobs for the various types of food items with which the system is used. A "roundness" parameter separates square patties from round patties.

Figure 7:
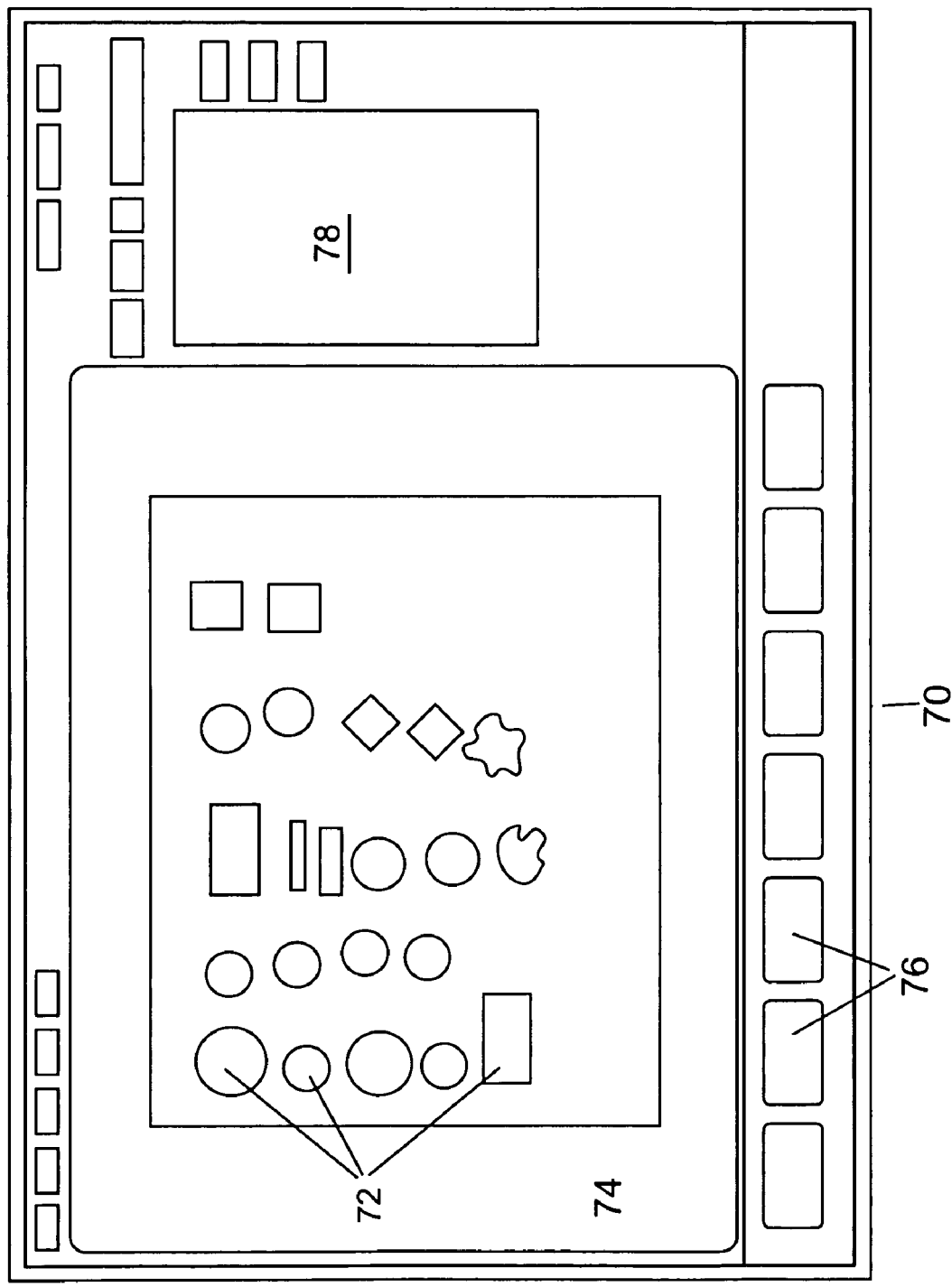
FIG. 7 is a view of a computer display screen of a vision system for identifying food items on a grill cooking station.

FIG. 7 shows a sample screen display 70 on a monitor connected to vision system 12. Display 70 is generated by the camera software, and shows the shapes and sizes of a variety of food types 72 on the surface of an image of a grill 74. The count of each type of food item 72 may be displayed in boxes 76 at the bottom of screen display 70, and control options may be displayed in box 78 at the right side of screen display 70. Of course, the layout and functional options of screen display 70 may be varied and adapted as desired for various types of restaurants. The following table describes some types of food products that may be identified and counted by vision system 12 based on their size, shape and/or color:

TABLE I

| Product Type | Physical Size | Color | Size/shape varies? |
| --- | --- | --- | --- |
| 10:1 burger patty | 3" diameter | Brown beef | No |
| 4:1 burger patty | 4" diameter | Brown beef | No |
| Grilled chicken | 3" diameter cooked in ring | White chicken meat | Yes |
| Sausage patty | 2½-3" diameter | Brown pork | No |
| Bacon | 1 × 4" | Reddish brown/ white stripes | Yes |
| Canadian bacon | 2½-3" diameter | Reddish brown pork | Yes |
| Steak patty | 3" square | Brown beef | No |
| Round eggs (in ring) | 3" diameter | White/yellow | No |
| Folded eggs | 2½" square | White/yellow | Yes |
| Scrambled eggs | Random | White/yellow | Yes |

As evident from the above table, some food types, e.g., scrambled eggs, are more challenging for a vision system to distinguish and may require more sophisticated software tools.

Figure 4:
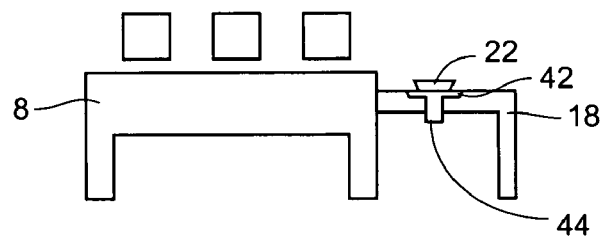
FIG. 4 is a schematic elevation view of a fryer cooking station for use with the invention.

FIG. 4 shows fryer 8 and its associated food transfer station 18. A weighing area 42 is located at food transfer station 18. Weighing area 42 utilizes a load cell 44 located under the surface of weighing area 42. Load cell 44 and weighing area 42 are located to the side of fryer 8 to reduce the chance of damage to load cell 44 from hot oil. A suitable load cell is model M2750-MK21 available from Muse Measurements of San Dimas, Calif. This model is compact and of stainless steel construction so that it can withstand the harsh operating environment and frequent washdowns typical in a restaurant kitchen. The load cell's analog output is connected to an analog input of system controller 40.

FIG. 5 illustrates an exemplary food storage cabinet 26 which includes slots 50 for receiving and holding trays 22. Trays 22 are sized to fit in slots 50 to ensure quick ingress and egress from either side of storage cabinet 26 during food service. Storage area controller 30 may be mounted on top of cabinet 26 as shown or at another convenient location. Controller 30 controls all aspects of the cabinet operation including storing data regarding food type, food temperatures and heating times. Data may be manually entered by an operator, received from vision system 12, weighing area 42, or system controller 40, or obtained from RFID tags 24 on trays 22.

Cabinet 26 may be provided with a keypad, buttons or other devices for manual data entry, and/or a touch screen for combined data display and entry. If a touch screen is provided, it may be used by an operator to enter into memory in controller 30 the individual foods that will be kept in cabinet 26 and their respective parameters such as heating times and temperatures. Either the entire cabinet or individual slots may be preprogrammed to activate heaters at specified temperatures and for specified lengths of time. A touch screen or other control may be used to change modes of operation, such as between breakfast and lunch menu modes, or to accommodate special or seasonal food items.

Each slot 50 of cabinet 26 is equipped with an RFID sensor 52 which activates and detects a signal from RFID tag 24 on tray 22 when tray 22 is inserted into slot 50. RFID sensor 52 is positioned, and its range of operation selected, so that it detects only RFID tag 24 on a tray 22 that is placed into slot 50 with which RFID sensor 52 is associated, so that it will not erroneously detect, for example, a tray 22 placed in an adjacent slot 50 or a tray 22 being moved near cabinet 26. Cabinet controller 30 recognizes that RFID tag 24 is associated with a particular tray 22 based on that tray's unique identification number which is stored in the memory of RFID tag 24, which in turn is associated with a particular type and quantity of food items that were cooked at a particular time. The latter association is based on data obtained from the system controller 40, vision system 12 and/or weighing area 42.

Each slot 50 may also be equipped with a weight sensor 54 to measure the weight of tray 22. As food items are removed from tray 22 by personnel working at food preparation table 32 to fill customer orders, the weight will be reduced. Based on the known nominal weight of the individual food items, cabinet controller 30 can calculate the number of food items remaining. If that number falls below a preset number, controller 30 will signal the operator to cook more of that type of food item. Controller 30 may also receive data from POS terminals 36 to calculate and predict the rate of customer demand and automatically change the preset threshold as necessary to meet demand during peak sales periods and eliminate waste when demand is slowing.

The time elapsed since insertion of a tray 22 into slot 50, or alternately, since the time the food items were cooked and removed from the cooking station, is monitored by controller 30 and displayed by LEDs 56 above each slot 50. The colors of LEDs 56 indicate the remaining usable length of time before expiration. For example, the LED color may be green, indicating approximately from 100% to 26% usable product life remaining, yellow for approximately from 25% to 0% usable life remaining and red for usable life expired. The LEDs may flash when the usable life has expired, and in additional an audible alert such as a buzzer may be activated. If there are multiple trays 22 of the same type of food items, the operator can easily scan the LEDs and see which tray to use first, e.g., to use a tray from a slot with a yellow LED before one with a green LED, so that the food items can be utilized on a first-in, first out basis to ensure freshness and reduce waste. Of course, a digital numeric display of time elapsed or remaining may be provided. For example, a touch screen or other display device may display an identification of each food in each slot 50 of cabinet 26 to permit an operator to read the location and status of the food in the respective trays 22, and may also show the time that each tray 22 has been held or other information about the food. However, the simple color LED scheme provides a quicker indication to the operator of the relative times applicable to each slot.

The RFID sensing capability of cabinet 26, controlled by cabinet controller 30, allows the automatic detection of tray insertion time, automatic heating, identification of the type of food items, the sequence in which food items should be used, and an indication of when food items must be discarded. Automating these functions reduces operator error, saves time, reduces waste and assures consistent quality of the food products. If an operator partially slides a tray 22 out of slot 50, e.g. to check the contents visually or to remove a food item for use at food preparation table 32, the RFID tag and sensor will allow timing and heating to continue when tray 22 is placed back in slot 50. RFID tag 24 can be detected some distance away from RFID sensor 52, e.g. one inch, and controller 30 can therefore continue to monitor tray 22 for timing and heat control. Further, because the RFID tag is associated with an individual tray, the system can track that tray even if it moved to a different slot 50 in cabinet 26, to a different cabinet, or to other locations within kitchen 2 if RFID sensors are provided at those locations.

Figure 6:
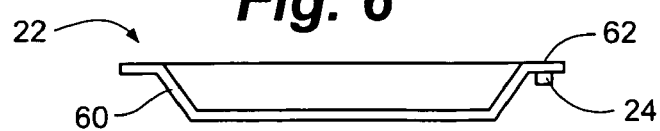
FIG. 6 is an example of a food holding tray with RFID tag of the invention.

An exemplary tray 22 for use with the system is shown in FIG. 6. Tray 22 is configured to accept a variety of food types and to fit easily into slots—in cabinets 26, 28. Tray 22 may be of any suitable material, but is preferably made of metal, for example, aluminum, which is durable, lightweight and allows rapid heat transfer to the food items therein. Tray 22 may be either reusable or disposable, e.g., made of foil, cardboard or paper. The ends 60 of tray 22 are preferably sloped to facilitate removal of food items. RFID chip 24 may be located at any convenient place on tray 22 so long as RFID tag 24 will be in range of RFID sensor 52 when tray 22 is inserted into a slot 50, but is preferably located at one end under lip 62 to protect it from damage during handling of the tray. RFID tag 24 may be embedded in the material of tray 22 or attached either permanently or removeably to its exterior.

System controller 40 interfaces with POS terminals 36 to provide various additional functions. For example, POS terminals 36 may send data of sales to system controller 40, which compares the number of each type of food item actually sold and delivered to customers with the number of food items prepared at fryer 8 and grill 10 and/or stored in holding cabinets 26, 28 to determine the percentage of waste (number of items discarded).

RFID label printers may be provided at service counter 34 and/or food preparation table 32. These printers are used to print RFID labels for some or all of the components of a customer order. The RFID labels are adhered to the product packaging to enable the tracking of product flow and order readiness as well as providing instructions for special orders (e.g., no pickles on a hamburger). For the special order application, RFID tag readers are positioned at food preparation table 32 to read the RFID tag on a specific sandwich packaging. A light indicator system or display assists the order assembler with information on which condiments to place on the sandwich.

For order readiness applications, an RFID reader may be positioned at other areas within kitchen 2 for completed order components. The readers are used to verify when all tagged components of an order are ready for pick-up and delivery to the customer.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed:

1. A method for managing the handling of food items in a restaurant, comprising:
   preparing a plurality of one type of a food item at a food preparation station;
   automatically identifying the type of the prepared food item based on at least one attribute of the food item and automatically counting the number of the prepared food items, by identifying means located at the food preparation station;
   providing at least one prepared food holding device;
   placing the prepared food items in the holding device;
   recording the time at which the food items were placed in the holding device;
   tagging the holding device with an RFID tag;
   providing at least one RFID interrogator for reading data from and writing data to the RFID tag on the holding device;
   encoding, by the interrogator, the RFID tag with the recorded time and with data from the identifying means to identify the type and number of food items; and
   providing a controller for receiving data from the identifying means and for sending data to and receiving data from the RFID interrogator.

2. The method of claim 1 wherein said automatically identifying the type and counting the number of prepared food items are performed by identifying means comprising a machine vision system including a camera positioned to capture an image of the food items on a cooking surface at the food preparation station.

3. The method of claim 1 wherein said automatically identifying the type and counting the number of prepared food items are performed by identifying means comprising an automatic weighing system using stored food item weight data.

4. The method of claim 1 further comprising generating by the controller a signal to indicate that the time elapsed since the recorded time on the RFID tag has exceeded a preset limit.

5. The method of claim 1 wherein the prepared food holding device is a tray and further comprising:
   providing a food holding cabinet having a plurality of slots for receiving and holding the trays, each slot having an RFID interrogator for reading data from and writing data to the RFID tag on a tray, the RFID interrogator being connected for communication with the controller.

6. The method of claim 5 further comprising establishing by the controller and based on the recorded time on the RFID tag an order for utilizing the trays on a first-in, first-out basis to deliver food items to customers.

7. The method of claim 6 further comprising providing a visual indicator associated with a slot of the food holding cabinet and illuminating by the controller the visual indicator to indicate to the operator which tray should be utilized first.

8. The method of claim 5 further comprising:
   providing an elapsed time indicator associated with a slot of the food holding cabinet;
   monitoring the time elapsed since a tray was placed in a slot; and
   activating the elapsed time indicator to signal the operator when the elapsed time exceeds a preset time.

9. The method of claim 5 further comprising:
   providing a weight sensor in a slot of the food holding cabinet;
   providing a low food quantity indicator associated with the slot;
   removing food items from the tray in the slot to fill customer orders;
   monitoring the weight of the tray in the slot by the weight sensor and calculating by the controller the number of food items remaining; and
   activating the low food quantity indicator to signal an operator when the number of food items remaining falls below a predetermined number.

10. The method of claim 1 further comprising:
    providing a point of sale terminal for entering customer orders for food items and completing the sale of the food items to the customer;
    transmitting data from the RFID tag and the point of sale terminal to the controller;
    storing in the controller the number of food items sold to customers based on data received from the point of sale terminal;
    storing in the controller the number of food items cooked and stored in a food holding device based on the number stored in the RFID tag; and
    calculating by the controller the percentage of cooked food sold and the percentage of cooked food wasted.

11. The method of claim 1 further comprising:
    providing a point of sale terminal for entering customer orders for food items and completing the sale of the food items to the customer;
    providing an RFID tag printer connected to the point of sale terminal; and
    printing an RFID tag with customer order data thereon.

12. The method of claim 1 further comprising:
    recording on the RFID tag the time at which the food items were prepared; and
    generating by the controller a signal to indicate that the time elapsed since the recorded time on the RFID tag at which the food items were prepared has exceeded a preset limit.

13. The method of claim 11 further comprising:
    affixing the RFID tag with customer order data thereon to a product package for a food product ordered by the customer.

14. The method of claim 13 further comprising:
    providing an RFID tag reader and a display device at a food preparation station;
    reading by the RFID tag reader the customer order data from the RFID tag;

displaying by the display information to assist an order assembler with preparation of the customer order.

15. The method of claim 5, wherein the tray has a lip extending from its upper edge on at least one side, and the RFID tag is affixed underneath the lip such that the RFID tag is protected from damage.

16. A method for cooking, storing and serving food items in a restaurant, comprising:
- selecting a plurality of one type of an uncooked food item from an uncooked food storage device;
- transferring the uncooked food items to a food preparation station;
- automatically detecting the type of the food item based on at least one attribute of the food item and automatically counting the number of the food items, at the food preparation station;
- sending food type and number data to a controller;
- cooking the food items at the food preparation station;
- transferring the cooked food items to a holding device;
- recording the time at which the food items were placed in the holding device;
- tagging the holding device with an RFID tag;
- encoding the RFID tag with the food type and number data and the time;
- sending to the controller the data encoded on the RFID tag;
- initiating a timer to measure the elapsed time from the recorded time;
- comparing the elapsed time to a preset time and, if the elapsed time exceeds a preset time, generating by the controller a signal to discard the cooked food items, and, if the elapsed time does not exceed the preset time, removing a cooked food item from the holding device to fill a customer order;
- detecting the number of cooked items remaining in the holding device and, if the number is less than a preset number, generating by the controller a signal to an operator to cook more food items of the type in the holding device.

17. The method of claim 16 wherein the food preparation station comprises a grill, and wherein said automatically detecting the type and number of food items is performed by identifying means comprising a machine vision system including a camera positioned to capture an image of the food items on a cooking surface of the grill.

18. The method of claim 16 wherein the food preparation station comprises a clamshell grill, and wherein said automatically detecting the type of food items is performed by identifying means comprising a sensor to measure the thickness of the food items based on the spacing of the platens of the grill.

* * * * *